(12) United States Patent
Belt (10) Patent No.: US 9,801,479 B2
(45) Date of Patent: Oct. 31, 2017

(54) RAILING SUSPENSION APPARATUS (71) Applicant: Thomas Lee Belt, Valley Center, CA (US)

(72) Inventor: Thomas Lee Belt, Valley Center, CA (US)

( * ) Notice: Subject to any disclaimer, the term of this patent is extended or adjusted under 35 U.S.C. 154(b) by 0 days.

(21) Appl. No.: 15/351,246

(22) Filed: Nov. 14, 2016

(65) Prior Publication Data

US 2017/0135505 A1    May 18, 2017

Related U.S. Application Data

(60) Provisional application No. 62/285,917, filed on Nov. 13, 2015.

(51) Int. Cl.
*A47G 29/00* (2006.01)
*A47G 7/04* (2006.01)
*F16M 13/02* (2006.01)

(52) U.S. Cl.
CPC ............ *A47G 7/045* (2013.01); *F16M 13/02* (2013.01)

(58) Field of Classification Search
USPC ........................................ 248/215
See application file for complete search history.

(56) References Cited

U.S. PATENT DOCUMENTS

| | | | | |
|---|---|---|---|---|
| 1,054,228 A * | 2/1913 | Medlin | ............... | A47B 23/06 182/188 |
| 1,388,799 A * | 8/1921 | Christensen | ............ | A01C 7/08 172/674 |
| 3,260,489 A * | 7/1966 | Hentzi | ................. | A47B 96/06 248/215 |
| 3,891,176 A * | 6/1975 | Downing | ............... | A47F 5/01 211/119 |
| 3,926,392 A * | 12/1975 | Davidson | ............ | D06F 81/003 248/117.1 |
| 4,088,292 A * | 5/1978 | Emminger | ......... | A47G 25/0607 248/205.1 |
| 4,099,693 A * | 7/1978 | Blann | .................... | E06C 7/143 248/210 |
| D397,287 S * | 8/1998 | Hergott | ..................... | D34/35 |
| 6,168,125 B1 * | 1/2001 | Winger | .................. | A47G 7/044 248/228.3 |
| 6,375,137 B1 * | 4/2002 | McQuade | ........... | A47B 96/061 248/205.1 |
| 6,375,141 B1 * | 4/2002 | Kettlestrings | ....... | A47B 43/006 211/106.01 |

(Continued)

*Primary Examiner* — Monica Millner (57) ABSTRACT

The railing suspension apparatus allows a user to detachably attach a variety of items while suspending an item from a railing. The apparatus includes a brace, an offset arm, a cantilever, and a hanger. The brace includes a main body and a post-receiving slot. The post-receiving slot traverses into the main body. The brace prevents the present invention from sliding along the railing. The offset arm is positioned perpendicular to the post-receiving slot and terminally connected to the offset arm opposite to the body. The offset arm positions the cantilever and hanger about the brace. The cantilever and the post-receiving slot is oriented opposite to each other, allowing the cantilever to rest on the railing while being pushed by the weight of the item engaged with the hanger. The hanger is terminally connected to the cantilever, opposite to the offset arm.

17 Claims, 10 Drawing Sheets

(56) References Cited

U.S. PATENT DOCUMENTS

| | | | | |
|---|---|---|---|---|
| 6,592,452 B1* | 7/2003 | Myers | ............... | A22C 11/00 |
| | | | | 452/51 |
| 6,971,204 B1* | 12/2005 | Gibney | ............ | A47G 7/044 |
| | | | | 47/39 |
| 7,690,612 B1* | 4/2010 | Branson | ............ | A47G 7/045 |
| | | | | 248/302 |
| 7,823,852 B1* | 11/2010 | Reno | .............. | A47G 7/044 |
| | | | | 248/218.4 |
| 8,561,345 B2* | 10/2013 | Armas | ............ | A47G 7/044 |
| | | | | 47/39 |
| 8,955,808 B2* | 2/2015 | Buschbach | ....... | F16M 13/02 |
| | | | | 248/175 |
| 9,166,385 B2* | 10/2015 | Newman | ........... | H02G 1/00 |
| 2011/0303809 A1* | 12/2011 | Tincher | ........... | A01K 97/10 |
| | | | | 248/214 |

* cited by examiner

RAILING SUSPENSION APPARATUS

The current application claims a priority to the U.S. Provisional Patent application Ser. No. 62/285,917 filed on Nov. 13, 2015. The current application is filed on Nov. 14, 2016 while Nov. 13, 2015 was on a weekend.

FIELD OF THE INVENTION

The present invention relates generally to railing accessories. More specifically, the present invention is a railing suspension apparatus that effectively detachably attaches to a variety of rails by grasping onto a post of the rail and resting on the rail.

BACKGROUND OF THE INVENTION

Hangers are a necessity for decorative landscaping. Hangers may be used to suspend a variety of outdoor accessories such as hanging flower pots, candles, torches, flags, and so on. Existing hangers require the use of clamps or screws to attach the hanger on an outdoor fence railing. This ruins the structural integrity and the appearance of the fence and may result in long term damage.

An objective of the present invention is to provide a hanger which is designed to attach to a rail without the need for clamps or screws and to provide easy installation and removal. The present invention wraps around a post of a fence or a railing and rests on top of the fence or railing. The portion of the present invention that wraps around the post of the fence or railing counteracts the force of an item hanging from the opposite end of the present invention. The user may hang a variety of items from the hook of the present invention. A first embodiment of the present invention however wraps around an item of which it is suspending. The weight of the suspended item does not damage the present invention as a second embodiment of the present invention comprises a reinforcement plate so that the cantilever may suspend items of higher weight.

DETAILED DESCRIPTION OF THE INVENTION

All illustrations of the drawings are for the purpose of describing selected versions of the present invention and are not intended to limit the scope of the present invention.

The present invention is a railing suspension apparatus that upholds a variety of items from a railing. A user may easily mount the present invention onto a railing in two simple motions without permanently fastening the present invention to the railing. The present invention comprises a brace 1, an offset arm 7, a cantilever 13, and a hanger 15. The brace 1 grips around a post of a railing and secures the positioning of the present invention onto the railing. The offset arm 7 elevates the cantilever 13 above the railing. The cantilever 13 rests on the railing and extends the hanger 15 away from the railing. The hanger 15 suspends an item. The item can be, but is not limited to, a hanging potted plants, and a hanging candle holders. The brace 1 comprises a main body 2 and a post-receiving slot 6. The main body 2 surrounds the post and slidably engages with the post. The post-receiving slot 6 traverses into the main body 2, thereby allowing the post to engage with the main body 2. The main body 2 is positioned perpendicular to the post-receiving slot 6 and terminally connected to the offset arm 7. This arrangement allows the offset arm 7 to elevate the cantilever 13 both above and behind the railing. The cantilever 13 is terminally connected to the offset arm 7, opposite the main body 2, so that the cantilever 13 is able to rest on the railing. Moreover, the cantilever 13 and the post-receiving slot 6 are oriented opposite to each other which allows one end of the cantilever to be anchored to the railing while an inertial movement is created in the opposite end of the cantilever. The weight of the item suspended from the hanger 15 applies a downward force onto the hanger 15 which is translated to cantilever 13. Consequently, the cantilever 13 pushes the brace 1 towards the engaged post and secures the present invention onto the rail. The hanger 15 is terminally connected to the cantilever 13, opposite to the offset arm 7. This arrangement allows an item to hang away from the railing.

In order to effectively wrap around a post of a railing, the main body 2 comprises a bridge 3, a first tab 4, and a second tab 5. The bridge 3, the first tab 4, and the second tab 5 slidably engages with the post. The offset arm 7 is connected adjacent to the first tab 4. Moreover, the bridge 3 is connected adjacent to the first tab 4, opposite to the offset arm 7. The second tab 5 is connected adjacent to the bridge 3, opposite to the first tab 4, such that the bridge 3 is positioned in between the first tab 4 and the second tab 5. The post-receiving slot 6 is delineated by the first tab 4, the bridge 3, and the second tab 5. It is understood that the first tab 4, the bridge 3, and the second tab 5 may be arranged into different orientations with each other about each other that best accommodate the structure of the posts of a rail. In the preferred embodiment of the main body 2, the first tab 4 and the second tab 5 is positioned parallel to each other. The bridge 3 is positioned perpendicular to both the first tab 4 and the second tab 5. This configuration allows the main body 2 to engage with a square-like post. Consequently, the offset arm 7 is oriented orthogonal to first tab 4, the second tab 5, and the bridge 3 so that the offset arm 7 distances the main body 2 from the cantilever 13.

In order for the cantilever 13 to rest on top of the railing, the offset arm 7 comprises a first linear portion 8, a second linear portion 9, and a spanning potion 10. The first linear portion 8 elevates both the second linear portion 9 and the spanning portion 10. The second linear portion 9 elevates the cantilever 13 above the railing. The spanning portion 10 positions the second linear portion 9 and, consequently, the cantilever 13 above the railing. The first linear portion 8 and the second linear portion 9 are positioned parallel and offset from each other and are positioned perpendicular to the cantilever 13. More specifically, the first linear portion 8 is connected adjacent to the cantilever 13, and the second linear portion 9 is connected adjacent to the brace 1. Consequently, the spanning portion 10 is connected in between the first linear portion 8 and the second linear portion 9, defining the position of the cantilever 13 and the hanger 15 about the brace 1.

In the preferred embodiment of the present invention, the spanning portion 10 is linear. The first linear portion 8 and the spanning portion 10 is oriented at a first obtuse angle 11 with each other. Similarly, the second linear portion 9 and the spanning portion 10 is oriented at a second obtuse angle 12 with each other. This configuration allows the first linear portion 8 to be centrally aligned with the post-receiving slot 6, which maximizes the amount of weight that can be upheld by the cantilever 13.

Figure 1:
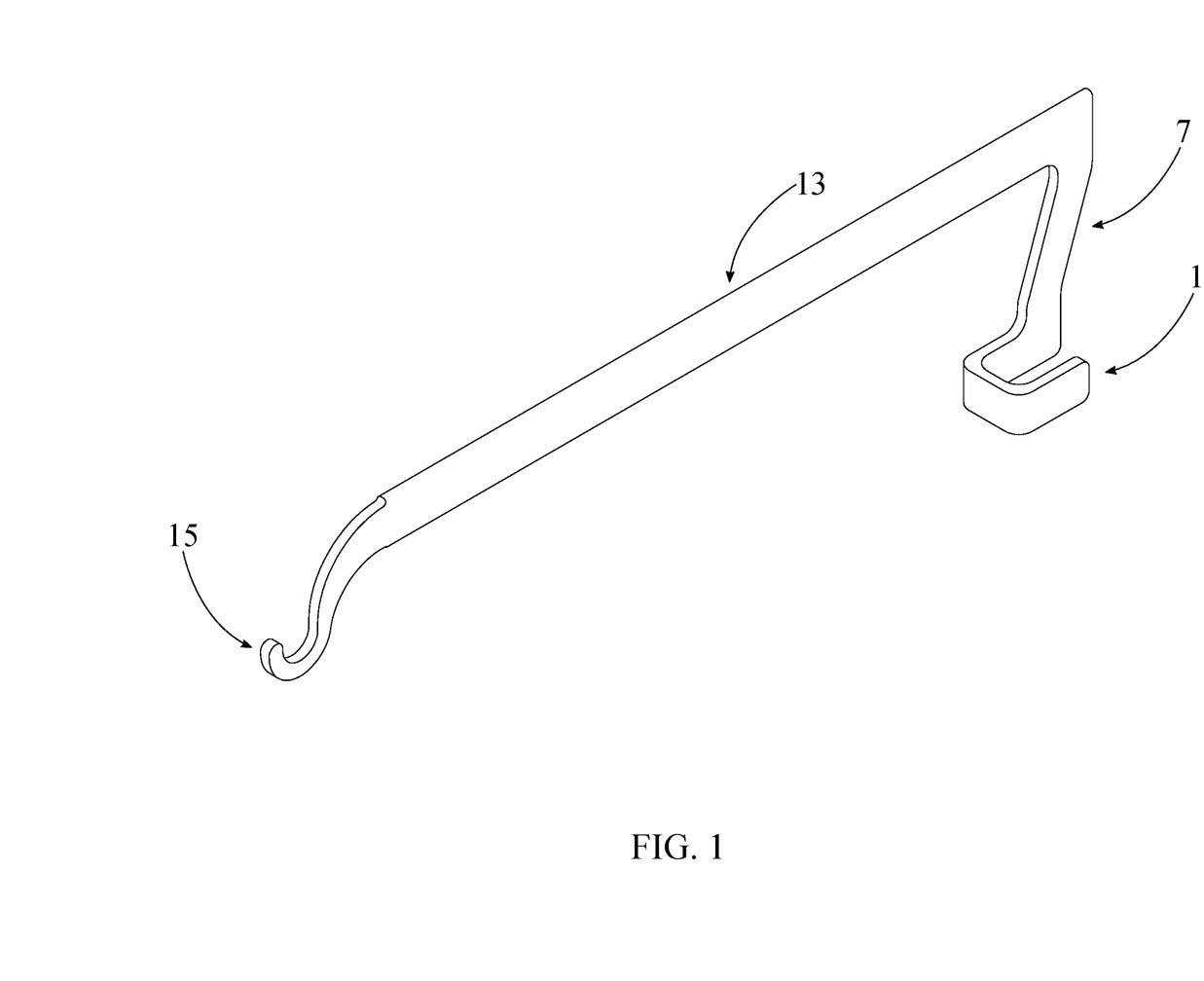
FIG. 1 is a perspective view of a preferred embodiment of the present invention.
Figure 2:
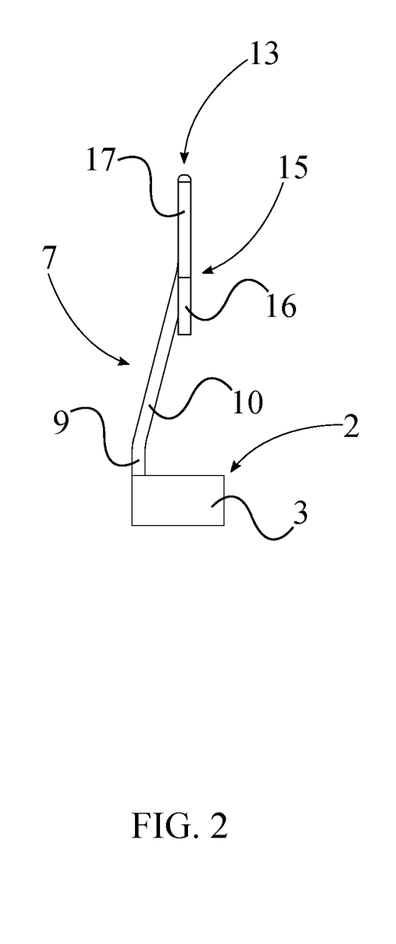
FIG. 2 is a front side view of the preferred embodiment of the present invention.
Figure 3:
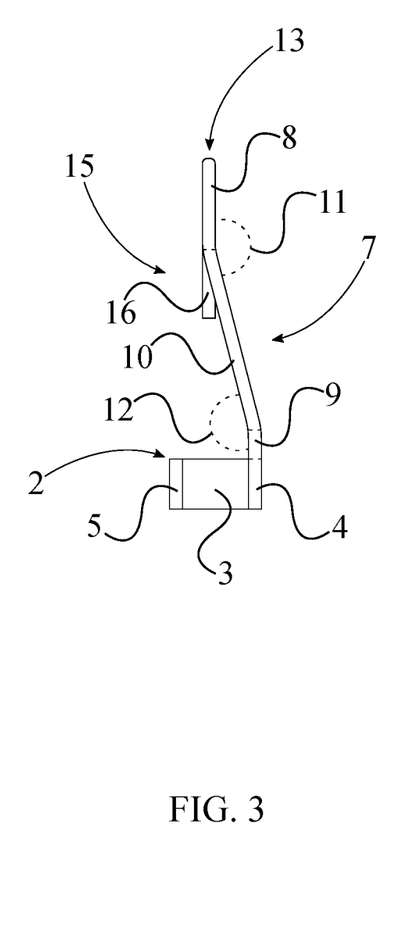
FIG. 3 is a rear side view of the preferred embodiment of the present invention.
Figure 4:
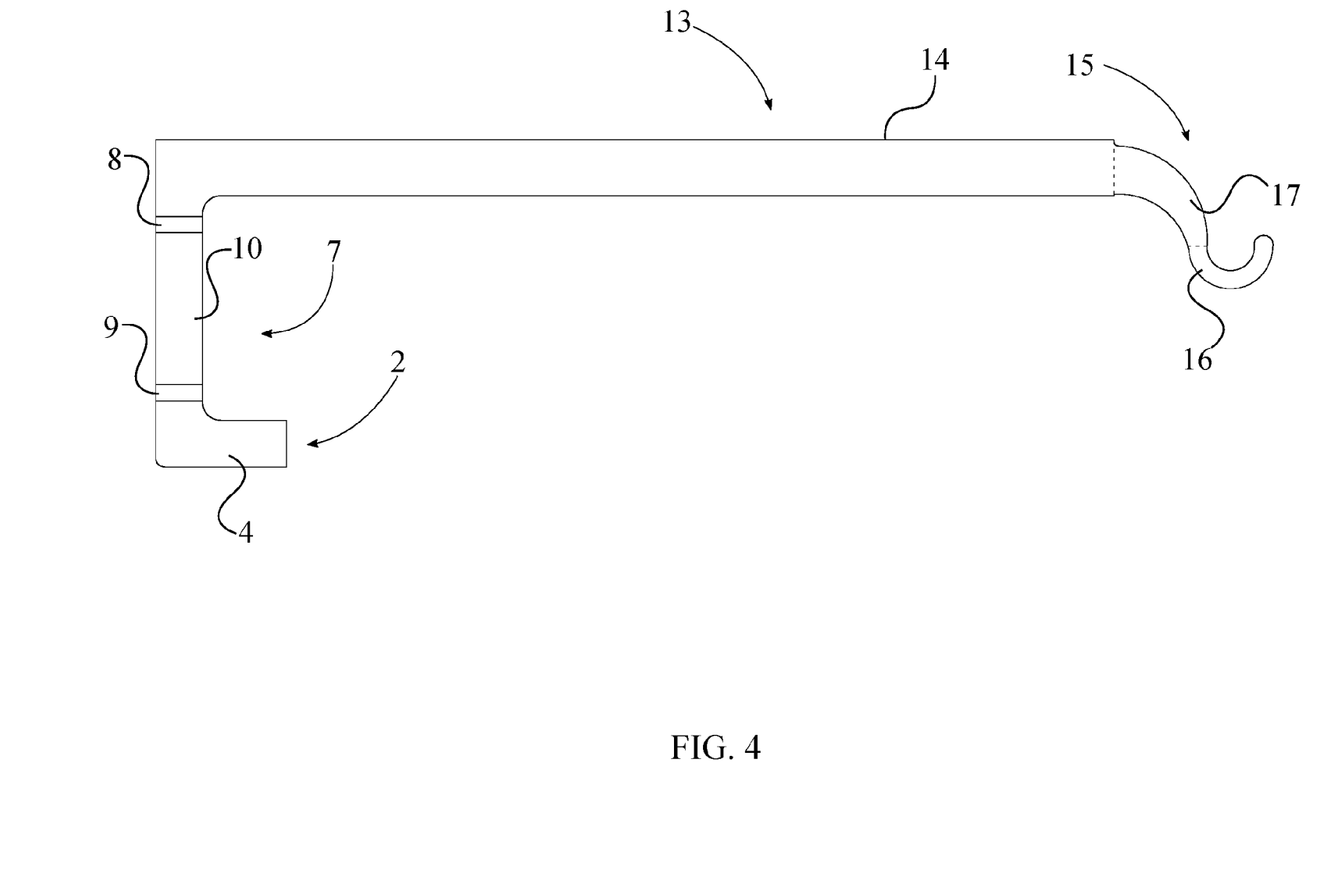
FIG. 4 is a left side view of the preferred embodiment of the present invention.
Figure 5:
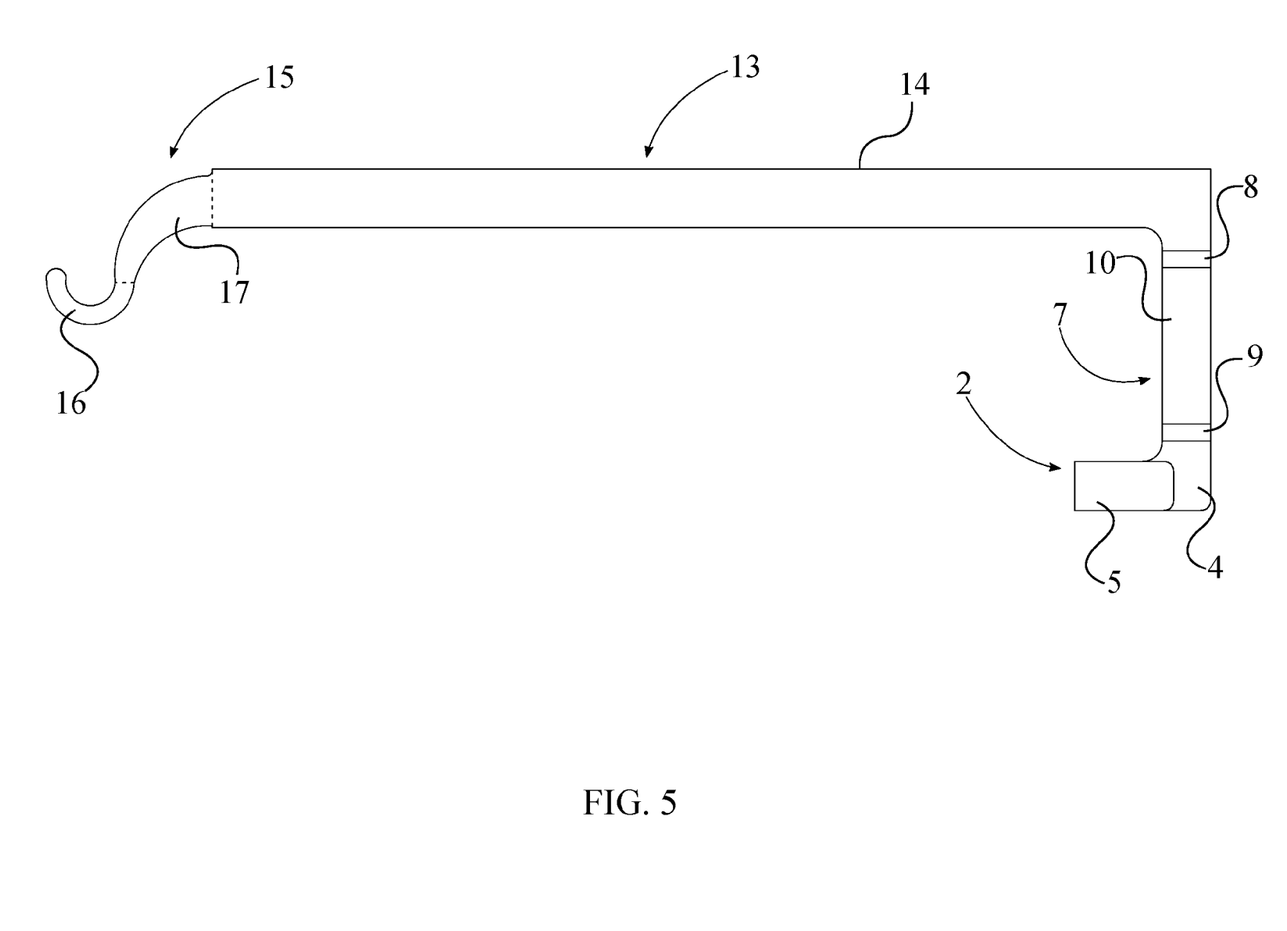
FIG. 5 is a right side view of the preferred embodiment of the present invention.
Figure 6:
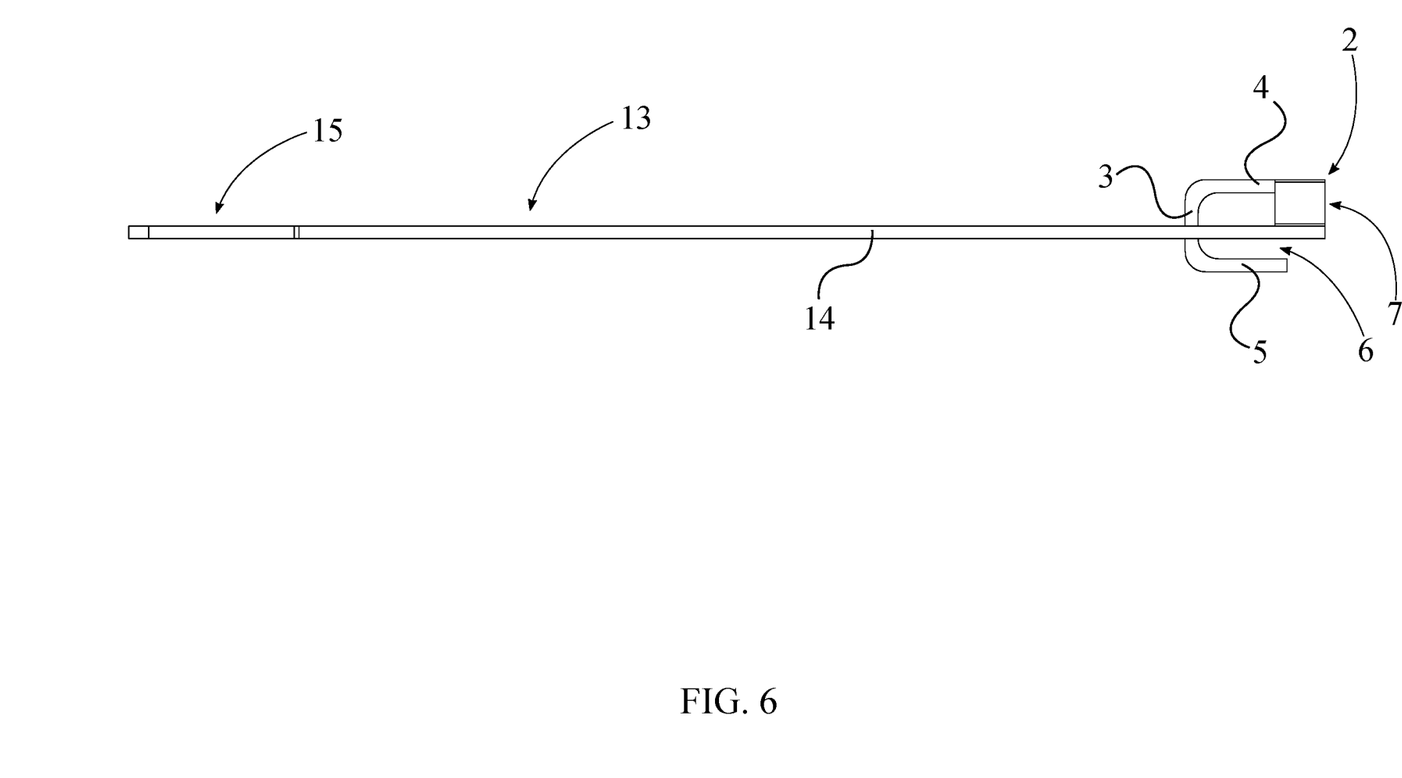
FIG. 6 is a top side view of the preferred embodiment of the present invention.
Figure 7:
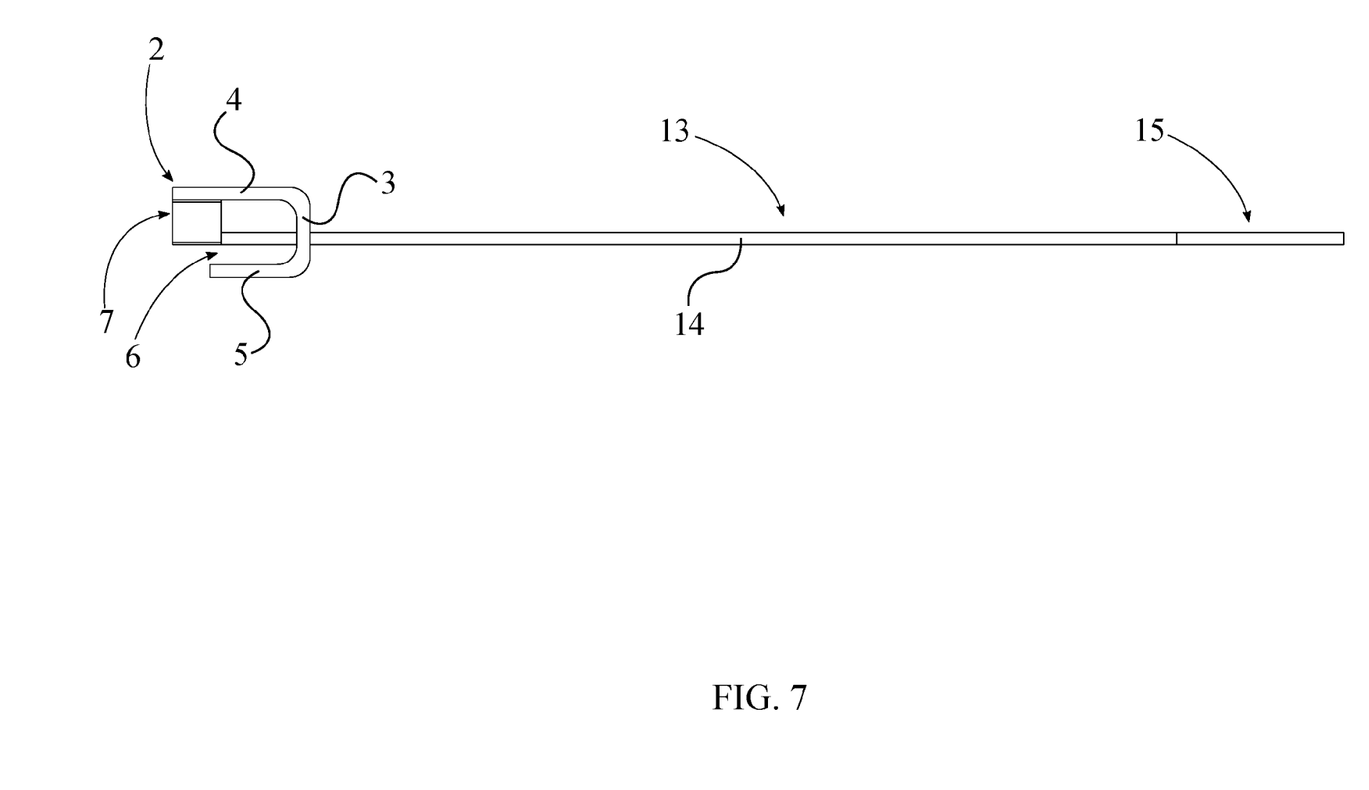
FIG. 7 is a bottom side view of the preferred embodiment of the present invention.
Figure 8:
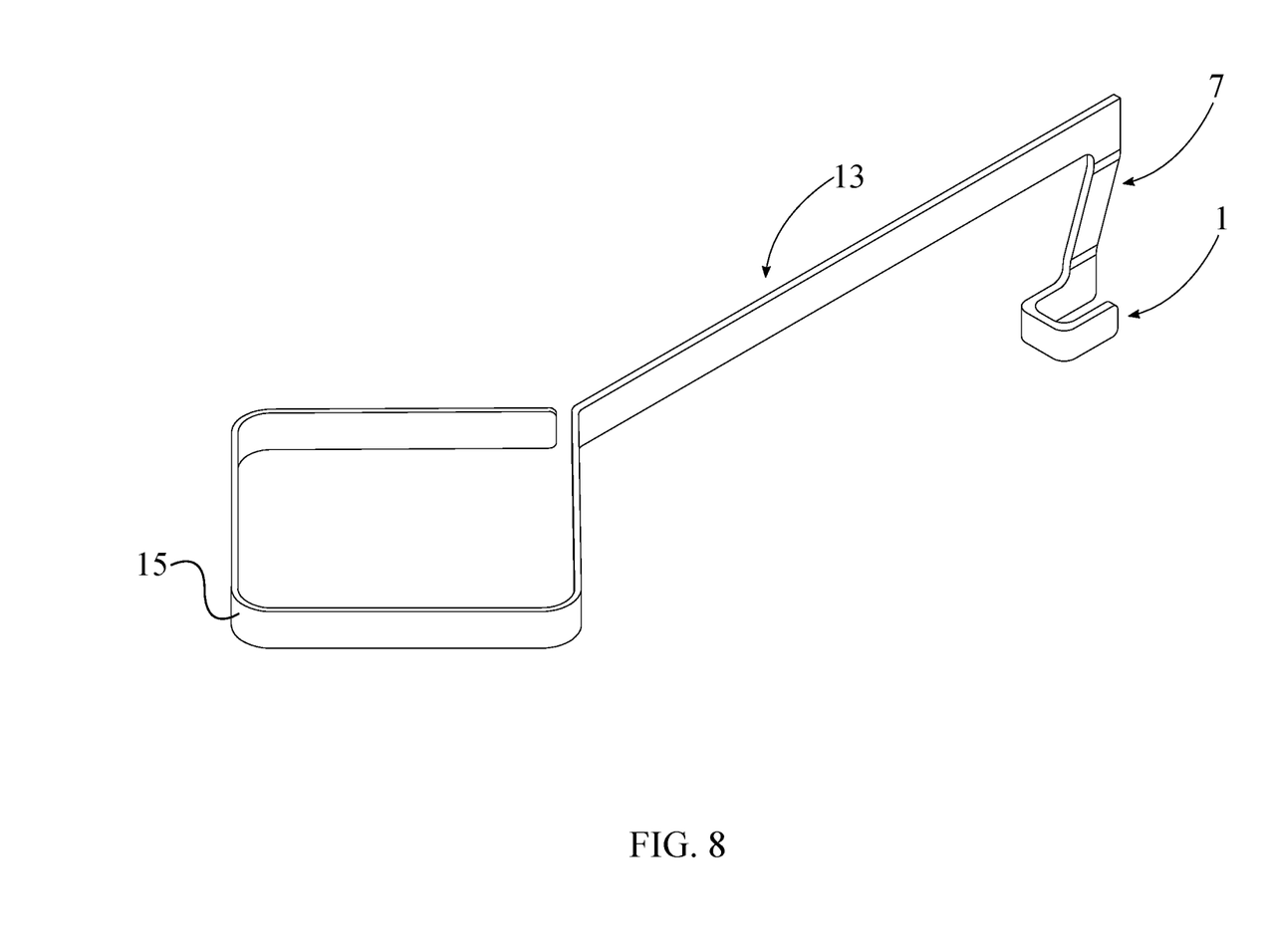
FIG. 8 is a perspective view of a first alternate embodiment of the present invention, wherein the first alternate embodiment uses a ring-shaped object to hold outdoor accessories.

In the preferred embodiment of the present invention, the hanger 15 comprises a hook portion 16 and a shank portion 17. The hook portion 16 suspends an item. The shank portion 17 orients the hook portion 16 such that the suspended item does not slip past or falls off the present invention. The shank portion 17 is collinearly positioned with the cantilever 13 and is connected adjacent to the cantilever 13. This collinear arrangement improves the structural integrity of the connection between the hanger 15 and the cantilever 13. Furthermore, the hook portion 16 is positioned adjacent to the shank portion 17, opposite to the cantilever 13 so that the hanger 15 suspends an item away from the railing. In an alternate embodiment of the present invention, the hanger 15 is a ring-shaped object 18 which surrounds an item as the item hangs from the present invention.

Figure 9:
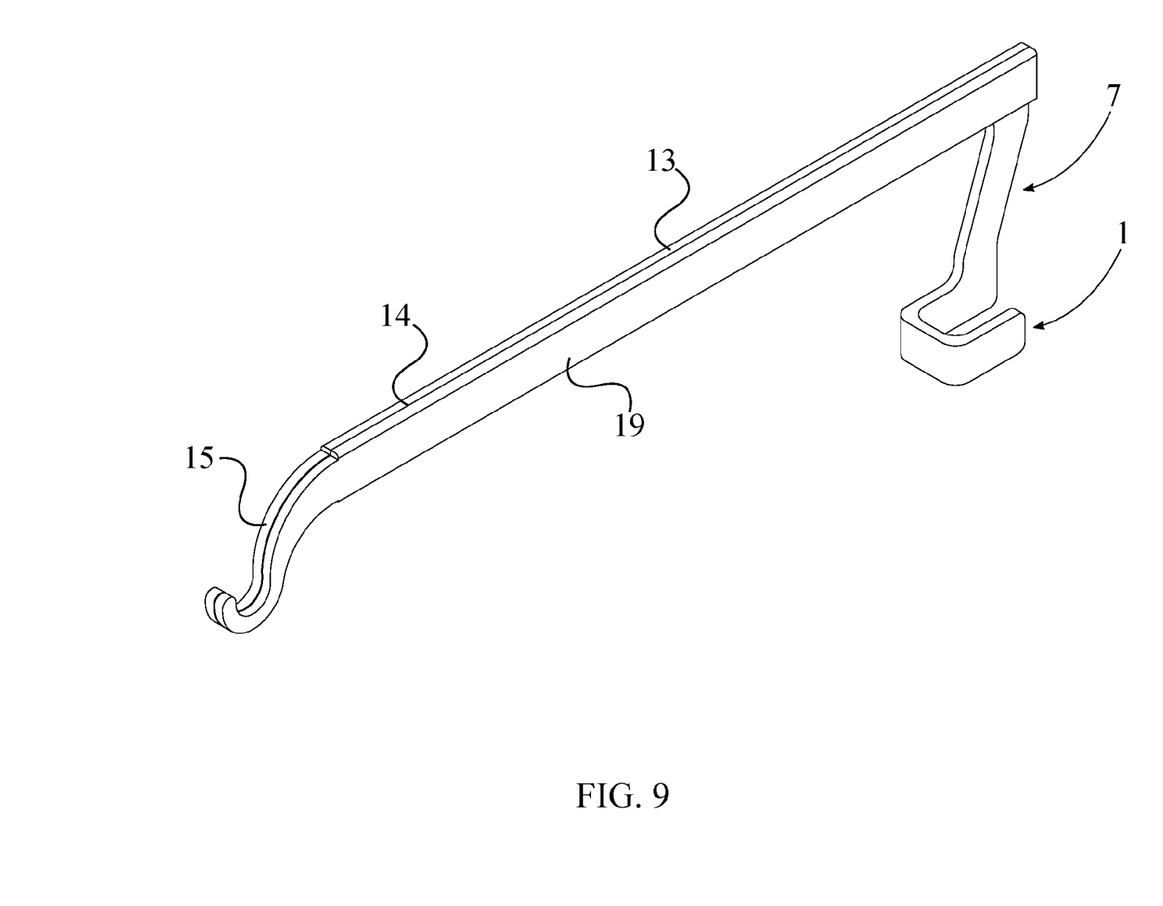
FIG. 9 is a perspective view of a second alternate embodiment of the present invention, wherein the second alternate embodiment uses a reinforcement plate to successfully support an item of heavier weight.
Figure 10:
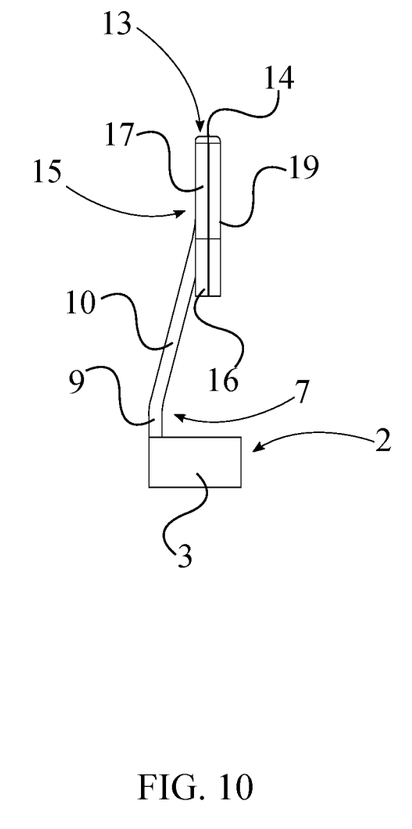
FIG. 10 is a front side view of the second alternate embodiment of the present invention.

In an alternate embodiment of the present invention, a reinforcement plate 19 provides structural support to the cantilever 13. The reinforcement plate 19 is coextensively shaped with the cantilever 13 and the hanger 15 and is connected along the cantilever 13. More specifically, a distal edge 14 of the cantilever 13 is positioned opposite to the offset arm 7, and the reinforcement plate 19 is connected along the distal edge 14. This arrangement doubles the thickness of the cantilever 13 and the hanger 15, thereby allowing the present invention to suspend more weight.

In order to properly use the present invention, the user inserts the brace 1 between a couple of adjacent posts of a railing. The user presses the offset arm 7 against the post adjacent the post-receiving slot 6 with the cantilever 13 in an upright manner behind the railing. The user pivots the cantilever 13 about the rail as the post slides into the post-receiving slot 6 until the cantilever 13 rests on the rail and main body 2 completely surrounds the post. The user hangs a variety of items from the hanger 15.

Although the invention has been explained in relation to its preferred embodiment, it is to be understood that many other possible modifications and variations can be made without departing from the spirit and scope of the invention as hereinafter claimed.

What is claimed is:

1. A railing suspension apparatus comprises:
   a brace;
   an offset arm;
   a cantilever;
   a hanger;
   the brace comprises a main body and a post-receiving slot;
   the post-receiving slot traversing into the main body;
   the offset arm being positioned perpendicular the post-receiving slot;
   the main body being terminally connected to the offset;
   the cantilever being terminally connected to the offset arm, opposite to the main body;
   the cantilever and the post-receiving slot being oriented opposite to each other;
   the hanger being terminally connected to the cantilever, opposite to the offset arm;
   the offset arm comprises a first linear portion, a second linear portion, and a spanning portion;
   the first linear portion and the second linear portion being positioned parallel and offset from each other;
   the first linear portion and the second linear portion being positioned perpendicular to the cantilever;
   the first linear portion being connected adjacent to the cantilever;
   the second linear portion being connected adjacent to the brace; and
   the spanning portion being connected in between the first linear portion and the second linear portion.

2. The railing suspension apparatus as claimed in claim 1 comprises:
   the main body comprises a bridge, a first tab, and a second tab;
   the offset arm being connected adjacent to the first tab;
   the bridge being connected adjacent to the first tab, opposite to the offset arm;
   the second tab being connected adjacent to the bridge, opposite to the first tab; and
   the post-receiving slot being delineated by the first tab, the bridge, and the second tab.

3. The railing suspension apparatus as claimed in claim 2 comprises:
   the first tab and the second tab being positioned parallel to each other;
   the bridge being positioned perpendicular to both the first tab and the second tab; and
   the offset arm being oriented orthogonal to the first tab, the second tab, and the bridge.

4. The railing suspension apparatus as claimed in claim 1 comprises:
   the spanning portion being linear;
   the first linear portion and the spanning portion being oriented at a first obtuse angle with each other; and
   the second linear portion and the spanning portion being oriented at a second obtuse angle with each other.

5. The railing suspension apparatus as claimed in claim 1 comprises:
   the first linear portion being centrally aligned with the post-receiving slot.

6. The railing suspension apparatus as claimed in claim 1 comprises:
   the hanger comprises a hook portion and a shank portion;
   the shank portion being collinearly positioned with the cantilever;
   the shank portion being connected adjacent to the cantilever; and
   the hook portion being positioned adjacent to the shank portion, opposite to the cantilever.

7. The railing suspension apparatus as claimed in claim 1 comprises:
   the hanger being a ring-shaped object.

8. The railing suspension apparatus as claimed in claim 1 comprises:
- a reinforcement plate;
- the reinforcement plate being coextensively shaped with the cantilever and the hanger; and
- the reinforcement plate being connected along the cantilever.

9. The railing suspension apparatus as claimed in claim 8 comprises:
- a distal edge of the cantilever being positioned opposite to the offset arm; and
- the reinforcement plate being connected along the distal edge.

10. A railing suspension apparatus comprises:
- a brace;
- an offset arm;
- a cantilever;
- a hanger;
- the brace comprises a main body and a post-receiving slot;
- the post-receiving slot traversing into the main body;
- the offset arm being positioned perpendicular the post-receiving slot;
- the main body being terminally connected to the offset;
- the cantilever being terminally connected to the offset arm, opposite to the main body;
- the cantilever and the post-receiving slot being oriented opposite to each other;
- the hanger being terminally connected to the cantilever, opposite to the offset arm;
- the main body comprises a bridge, a first tab, and a second tab;
- the offset arm being connected adjacent to the first tab;
- the bridge being connected adjacent to the first tab, opposite to the offset arm;
- the second tab being connected adjacent to the bridge, opposite to the first tab;
- the post-receiving slot being delineated by the first tab, the bridge, and the second tab;
- the offset arm comprises a first linear portion, a second linear portion, and a spanning portion;
- the first linear portion and the second linear portion being positioned parallel and offset from each other;
- the first linear portion and the second linear portion being positioned perpendicular to the cantilever;
- the first linear portion being connected adjacent to the cantilever;
- the second linear portion being connected adjacent to the brace; and
- the spanning portion being connected in between the first linear portion and the second linear portion.

11. The railing suspension apparatus as claimed in claim 10 comprises:
- the first tab and the second tab being positioned parallel to each other;
- the bridge being positioned perpendicular to both the first tab and the second tab; and
- the offset arm being oriented orthogonal to the first tab, the second tab, and the bridge.

12. The railing suspension apparatus as claimed in claim 10 comprises:
- the spanning portion being linear;
- the first linear portion and the spanning portion being oriented at a first obtuse angle with each other; and
- the second linear portion and the spanning portion being oriented at a second obtuse angle with each other.

13. The railing suspension apparatus as claimed in claim 10 comprises:
- the first linear portion being centrally aligned with the post-receiving slot.

14. The railing suspension apparatus as claimed in claim 10 comprises:
- the hanger comprises a hook portion and a shank portion;
- the shank portion being collinearly positioned with the cantilever;
- the shank portion being connected adjacent to the cantilever; and
- the hook portion being positioned adjacent to the shank portion, opposite to the cantilever.

15. The railing suspension apparatus as claimed in claim 10 comprises:
- the hanger being a ring-shaped object.

16. The railing suspension apparatus as claimed in claim 10 comprises:
- a reinforcement plate;
- the reinforcement plate being coextensively shaped with the cantilever and the hanger; and
- the reinforcement plate being connected along the cantilever.

17. The railing suspension apparatus as claimed in claim 16 comprises:
- a distal edge of the cantilever being positioned opposite to the offset arm; and
- the reinforcement plate being connected along the distal edge.

\* \* \* \* \*